United States Patent [19]

Nosowicz et al.

[11] Patent Number: 5,058,905
[45] Date of Patent: Oct. 22, 1991

[54] SEAL

[76] Inventors: Josef Nosowicz, Richard-Wagner-Strasse 1, D-8192 Geretsried; Rudolf Kollinger, Richard-Wagner-Strasse 10, D-8034 Germering, both of Fed. Rep. of Germany

[21] Appl. No.: 417,471

[22] Filed: Oct. 5, 1989

[30] Foreign Application Priority Data

Oct. 7, 1988 [DE] Fed. Rep. of Germany ....... 3834214

[51] Int. Cl.$^5$ ............................................. F16J 15/38
[52] U.S. Cl. .................................. 277/65; 277/81 R; 277/82; 277/96.1; 277/136
[58] Field of Search .................... 277/65, 81 R, 82, 83, 277/96.1, 136, 63

[56] References Cited

U.S. PATENT DOCUMENTS

| 3,499,653 | 3/1970 | Gardner | 277/83 |
| 4,434,986 | 3/1984 | Warner | 277/65 |
| 4,443,015 | 4/1984 | Duffee et al. | 277/83 |
| 4,842,494 | 6/1989 | Speiser | 277/65 |

FOREIGN PATENT DOCUMENTS 1928675 2/1970 Fed. Rep. of Germany .

Primary Examiner—William A. Cuchlinski, Jr.
Assistant Examiner—Daniel G. DePumpo
Attorney, Agent, or Firm—Spencer & Frank

[57] ABSTRACT

The sliding face (22) of a gas lubricated slide ring seal has a slide ring (20) which is displaceable in the axial direction at a wall (4) to be sealed and lies against the sliding face (21) of a mating ring (10) which is fastened on an intermediate sleeve (10) so as to be immovable and sealing. The intermediate sleeve is rotatably mounted by roller bearings (16) on the shaft (2) to be sealed and is sealed against the shaft by a dynamic sealing device (15). Between the shaft (2) and the intermediate sleeve (10) a coupling (17) is provided which couples the shaft with the intermediate sleeve (10) during rotation of the shaft in its regular direction of rotation (1'), thus driving the mating ring (19) and pumping gas from the chamber (6) to be sealed through conveying grooves (24) disposed in its sliding face (21) into the area between the two sliding faces 21, 22). In the opposite direction of rotation (1''), the coupling (17) decouples for preventing the sliding faces (21, 22), from performing a relative movement opposite to that during rotation in the regular direction (1').

11 Claims, 3 Drawing Sheets

SEAL

BACKGROUND OF THE INVENTION

The invention relates to a seal for a shaft which, in regular operation, rotates in a first direction of rotation and passes through a wall which separates a higher pressure chamber from a lower pressure chamber, the seal including at least one seal component group which performs the sealing function in the first direction of rotation. Each one of these seal component groups includes, on the one hand, a first sealing member supported radially and in at least one axial direction at the shaft or at a component fixed thereto and connected with the shaft or the component by way of a first torque transmitting device while being sealed against the shaft by means of a first auxiliary seal arrangement. On the other hand, the seal component group includes a second sealing member supported radially and in at least one axial direction at the wall or at a component fixed thereto and connected with the wall or the component by way of a second torque transmitting device while being sealed against the wall or the component by means of a second auxiliary sealing arrangement. Both sealing members lie adjacent one another, either directly or separated by a thin layer of medium, at a sealing gap which receives the relative rotational movements.

Shafts which, in regular operation, rotate in only one predetermined direction, may take up the opposite direction of rotation under special operating conditions. One example for this is compressors which are always driven in one direction of rotation by a motor. If the motor is turned off and the compressor is charged with pressure on its low-pressure side, the compressor becomes a motor which drives the shaft in a direction opposite to its regular direction of rotation. The revolutions of the shaft in this opposite direction of rotation, even if they last only a relatively short time and/or do not occur at the same rate as in the regular direction of rotation, may lead to damaging consequences for the shaft seal due to increased wear on the slide seal faces or the furthering of leakages in an undesirable direction.

Gas lubricated slide ring seals are exposed to the danger of destruction to a particular degree after even a short-term reversal of the direction of rotation. Such slide ring seals are provided with conveying grooves in one of their two slide seal faces. Such grooves start from the higher-pressure chamber and pumping gas between the slide seal faces during rotation of the shaft in the first regular direction of rotation so that a gas pressure cushion is built up which separates the slide seal faces. In the opposite direction of rotation, these conveying grooves pull the gaseous medium out of the region of the sealing gap or are at least unable to build up gas pressure cushions. This results in direct contact between the slide ring faces, thus greatly increasing friction and destroying the sliding faces in the shortest time. Although attempts have been made to permit the establishment of pressure cushions in both directions of rotation by special selection of the groove shape and particularly a symmetrical configuration of the grooves relative to a radius placed through the axis of rotation, gas lubricated slide ring seals having such conveying grooves do not permit the establishment of sufficient gas pressure cushions in operation in the regular direction of rotation and have too high a leakage rate in regular operation.

SUMMARY OF THE INVENTION

It is an object of the invention to improve a seal of the above-mentioned type in such a way that, during rotation of the shaft to be sealed in the regular direction of rotation, the seal can be configured with respect to optimum operational behavior and no damaging consequences occur during operation in the opposite direction of rotation.

This is accomplished according to the invention in that at least one of the sealing members is rotatably arranged in a bearing which is coaxial with the shaft; the torque transmitting device of the thus rotatably arranged sealing member is configured as a free-wheeling coupling (a coupling that is dependent from the direction of rotation) which, when the shaft rotates in the first direction of rotation, couples in the sense of torque transmission and decouples in the second direction of rotation; and each auxiliary sealing arrangement associated with a sealing member equipped with a free-wheeling coupling includes a dynamic sealing device which, at least for a limited time, is able to absorb a relative rotational movement and seals the leakage path created by the free-wheeling coupling and the bearing.

BRIEF DESCRIPTION OF THE INVENTION

DESCRIPTION OF THE PREFERRED EMBODIMENTS

Figure 1:
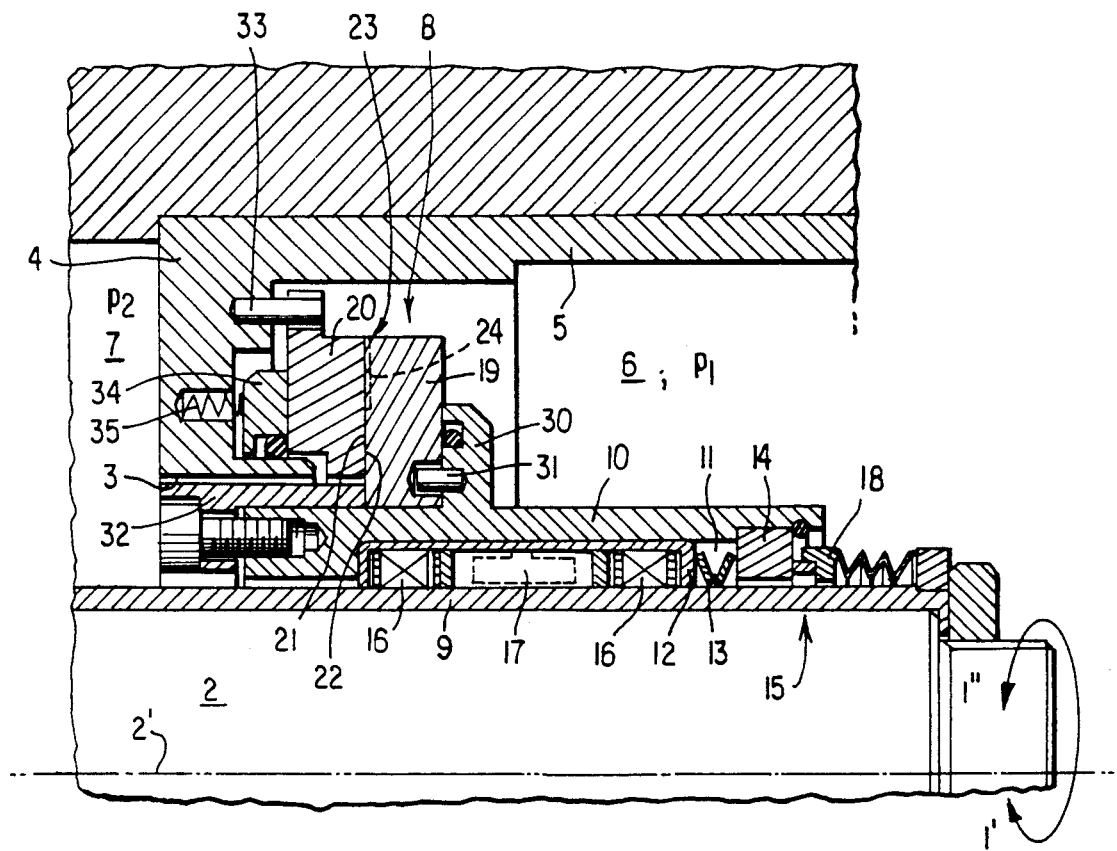
FIG. 1 is a longitudinal sectional view of the upper portion of a gas lubricated slide ring seal configured according to the invention in a single-action arrangement.

The seal shown in FIG. 1 serves to seal a shaft 2 which, in regular operation, rotates about its axis 2' in a first direction of rotation 1' and is brought through an opening 3 in a wall 4. This wall 4, which is part of a seal housing 5, separates a chamber 6 containing a gas under a higher pressure $p_1$, e.g. the high pressure side of a turbo compressor, from a chamber 7 under a lower pressure $p_2$, e.g. the free atmosphere. A seal component group which, in its entirety, is given the reference numeral 8 serves to seal shaft 2 in the mentioned regular direction of rotation 1'.

A shaft sleeve 9 which is fixed to shaft 2 and sealed against it is surrounded by an intermediate sleeve 10 which, follows lower pressure chamber 7 is provided with an internal collar which projects radially inwardly to the vicinity of the sleeve shaft and which is followed by a larger diameter first cylindrical bore section which again changes, by way of an internal shoulder, into a second cylindrical bore section again having a larger diameter and being disposed adjacent higher-pressure chamber 6. A sheet metal cage 12 having a U-shaped cross section is disposed in the annular chamber 11 defined by the first bore section and shaft sleeve 9. One end face of this cage is supported at the inner collar; its outer circumference is in a force locking connection with the first bore section and its second end face is subjected to the bias of plate springs 13 which, in turn is are supported at a mating ring 14 of a dynamic sealing device 15 to be described below.

Adjacent to each of its axial ends, sheet metal cage 12 includes a roller bearing 16 which rotatably supports intermediate sleeve 10 on shaft sleeve 9.

Between the two roller bearings 16, there is disposed a grip roller free-wheeling coupling 17 of such configuration that rotation of shaft 2 in the first direction of rotation 1' corresponding to regular operation causes a torque to be transmitted, i.e. intermediate sleeve 10 is carried along by shaft sleeve 9 and thus by shaft 2 while, in the opposite direction of rotation 1", the shaft is able to rotate freely relative to the intermediate sleeve. This intermediate sleeve 10 is sealed against shaft sleeve 9 by means of the already mentioned dynamic sealing device 15 which is configured as a slide ring seal whose mating ring 14 is held in the second bore section of intermediate sleeve 10 in a forcelocking fit and is additionally held in both axial direction by the internal shoulder and an internal catch ring and surrounds shaft sleeve 9 with radial play. A slide ring 18 lies against this mating ring 14, rotates together with shaft 2 and is sealed against shaft sleeve 9 by means of a metal bellows which also serves as a compression spring and to transmit torque. This dynamic sealing device 15 need only be designed for a limited period of stress during which shaft 2 rotates in a direction opposite to the regular direction of rotation 1' and, depending on the given conditions of use, may also be replaced by a seal of different construction, for example a lip seal.

The seal component group 8, which during operation in the regular direction of rotation 1' absorbs relative rotational movement, is formed by a gas blocked slide ring seal including, as its first sealing member 19, a mating ring which, in the mentioned first direction of rotation of shaft 2, is coupled with the shaft by way of free-wheeling coupling 17 and which includes is as its second sealing member 20, a slide ring that is held at wall 4 in a manner secure against rotation. The two sealing members 19 and 20 have slide seal faces 21 and 22, respectively, which lie in planes perpendicular to axis 2' and with which they contact one another while forming a sealing gap 23.

Figure 2:
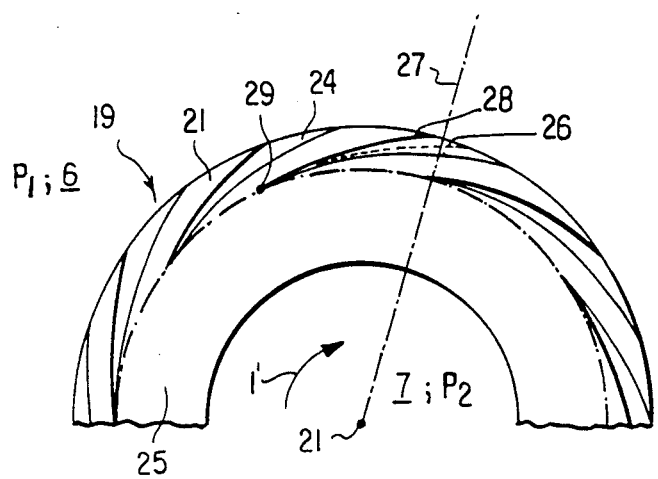
FIG. 2 is a partial top view to a smaller scale of the slide seal face of the slide ring seal of FIG. 1 equipped with conveying grooves.

As illustrated in FIG. 2, conveying grooves 24 are worked into the slide seal face 21 of the first sealing member 19 (mating ring). These grooves are arranged at equal angular spacings from one another and emanate from chamber 6 which is under the higher pressure $p_1$ but do not extend to chamber 7 which is under the lower pressure $p_2$ so that an annular zone 25 remains in the region of sealing gap 23 adjacent the latter chamber, within which no grooves exist within slide seal faces 21 and 22.

A centerline 26 disposed between the two lateral delimitations of each conveying groove 24 is inclined relative to radii placed through shaft axis 2' and describes at least approximately a circle. For special cases, conveying grooves 24 may also be disposed in slide seal face 22 of slide ring 20 instead of in the mating ring. In any case, and also in a modified embodiment (not illustrated) in which the sealing members 19 and 20 are charged from the interior, the direction of inclination of center line 26 must be selected in such a manner that a point 28 at which this centerline intersects with an imaginary straight line 27 fixed to the contacting other groove-less slide seal face and going through shaft axis 2' travels, during rotation of shaft 2 in the regular direction of rotation 1', from the open groove end to the closed groove end 29 adjacent annular zone 25.

The first sealing member 19 (mating ring) which essentially has the shape of a circular ring having a rectangular cross section has its bore pushed onto intermediate sleeve 10 and is supported, with its rear side facing away from slide seal face 21, by a collar 30 which projects radially outwardly from the intermediate sleeve and is sealed against this collar by means of an O-ring disposed in an annular groove of this collar. An axially parallel pin 31 is provided for the transmission of torque and projects into bores of collar 30 and of first sealing member 19. To further secure its position and improve the transmission of torque is a pressure sleeve 32 is provided which is pushed with one section of its length onto intermediate sleeve 10, presses with its frontal face against a radially inwardly oriented extension of slide seal face 21 of the first sealing member 19 and at its other end extends by way of a radially inwardly projecting collar over the frontal face of intermediate sleeve 10 at the point where it is screwed to the intermediate sleeve.

From wall 4 of seal housing 5 in the region of opening 3, a tubular collar projects in the direction toward chamber 6. The second sealing member (slide ring) 20 is mounted on this collar so as to be axially displaceable by way of its stepped bore. An annular pressure piece 34 which is held under tension by springs 35 held in blind bores in wall 4 lies against the rear side of second sealing member 20 where it faces away from slide seal face 22. An O-ring held in an inner shoulder of pressure piece 34 seals second sealing member 20 against the collar. An axially parallel pin 33 serves to transfer the torque from second sealing member 20 to wall 4.

During rotation of shaft 2 in the first, regular direction of rotation 1', free-wheeling coupling 17 transmits the torque from the shaft to first sealing member 19 so that seal component group 8 operates in the manner of a conventional gas lubricated slide ring seal. No relative rotational movement takes place here between mating ring 14 and slide ring 18 of dynamic sealing device 15 so that these components are not subjected to any wear and produce no additional friction energy. If shaft 2 rotates in the opposite direction of rotation 1", free-wheeling coupling 17 decouples and no torque is transmitted from shaft 2 to first sealing member 19 and slide seal faces 21, 22 are protected against damage. The relative rotational movement in this case is absorbed by dynamic sealing device 15.

In the description below of further embodiments of the invention, the same reference numerals, if necessary supplemented by indices, are employed for identical components or components having the same effect. The description of these components can therefore be taken from the above description of the first embodiment.

Figure 3:
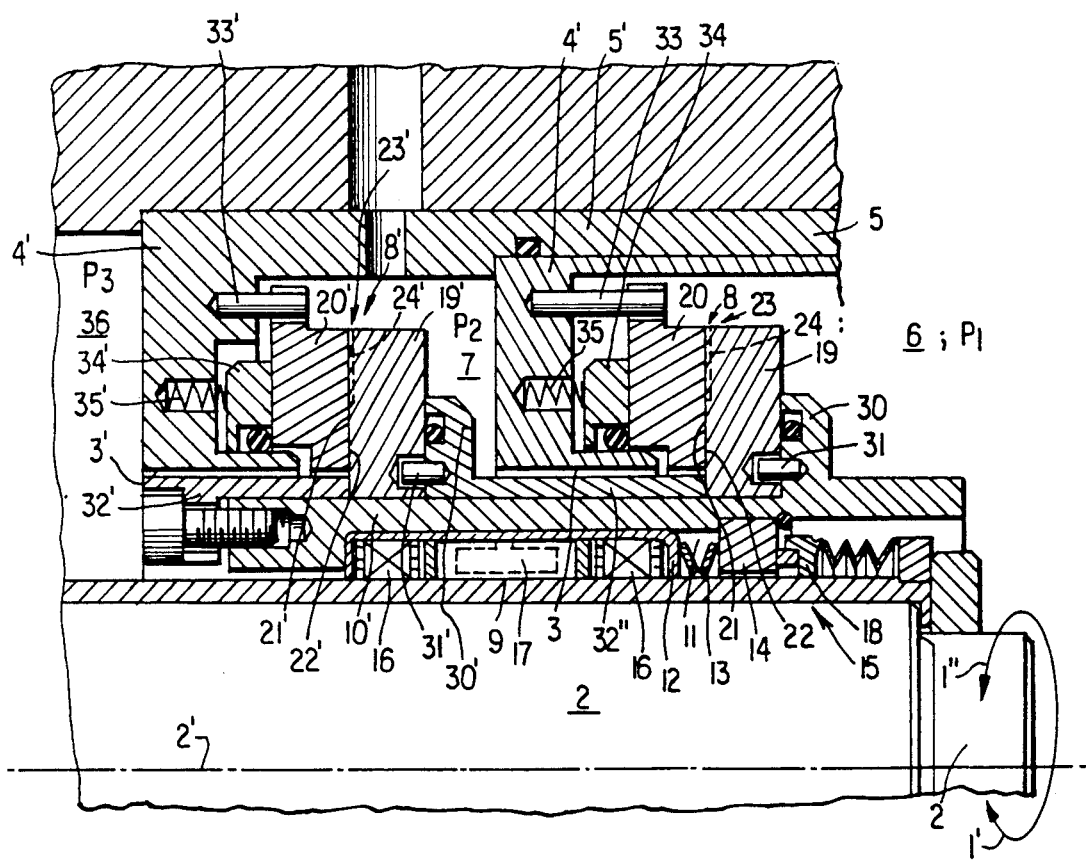
FIG. 3 is a longitudinal sectional view of the upper portion of a gas lubricated slide ring seal configured according to the invention in tandem arrangement.

The second embodiment shown in FIG. 3 relates to a gas lubricated slide ring seal in a tandem arrangement. Accordingly, two seal component groups 8 and 8' are provided which seal walls 4 and 4' against shaft 2 and against intermediate sleeve 10. Accordingly, there exists a further chamber 36 which is under a pressure $p_3$, with the total pressure conditions being represented as $p_1 > p_2 > p_3$. Through the intermediary of a spacer pressure sleeve 32" equipped with a radially outwardly projecting collar 30' and an inserted O-ring, the first sealing members (mating rings) of the two seal component groups are disposed on a common intermediate sleeve 10' so that, upon rotation of shaft 2 in a direction of rotation 1" opposite to the regular direction of rotation, all slide seal faces are protected against destruction.

Figure 4:
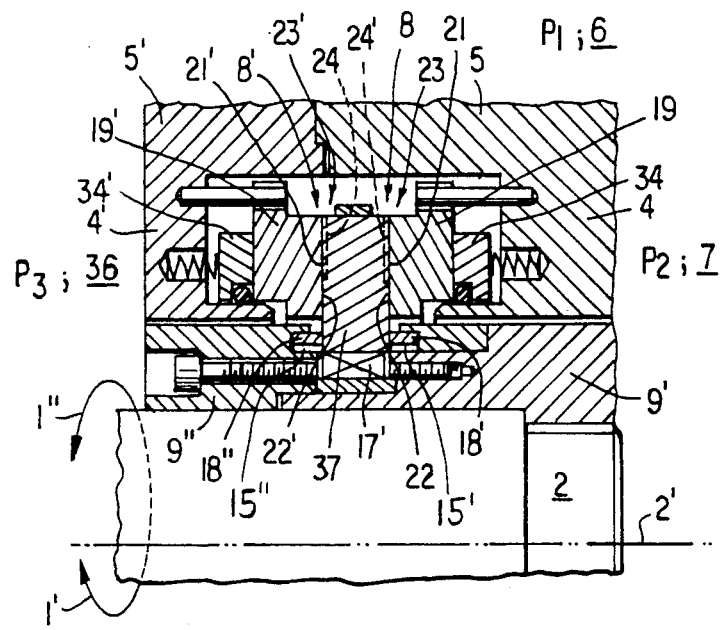
FIG. 4 is a longitudinal sectional view of the upper portion of a gas lubricated slide ring seal according to the invention in a dual-action arrangement.

The third embodiment shown in FIG. 4 depicts a gas lubricated slide ring seal in double-action arrangement. Under consideration of the chambers shown in the drawing, the pressure distribution is again $p_1$(chamber 6)$> p_2$ (chamber 7)$> p_3$ (chamber 36). The first two sealing members are combined into a joint annular disc-shaped body 37 which, on each axial end face, has a slide seal face 21, 21', both extended radially inwardly and is adjacent to the bore in this body, serving as slide ring faces for the slide rings 18', 18" of the dynamic sealing device. Each slide ring 18 and 18' is held in one part of the divided shaft sleeve 9', 9", with the one slide ring 18' being resiliently supported in the axial direction. Both slide rings 18', 18" also determine the axial position of body 37. The bore of body 37 forms the one coupling face of free-wheeling coupling 17', the latter simultaneously also determining the radial position of this body. Conveying grooves 24, 24' are configured in the manner described earlier in connection with FIGS. 1 and 2, i.e. in each case with reference to top views thereof, conveying grooves 24 and 24' are sloped in opposite directions relative to radii drawn through axis of rotation 2'.

In a simplified embodiment (not illustrated) of the seals according to the above-described embodiments, free-wheeling coupling 17 or 17' may be omitted or replaced by a slide or roller bearing, in which case the compressive pressure of dynamic sealing devices 15, 15', 15" must be dimensioned large enough that they produce a slip-free friction connection until a torque is generated which is slightly greater than the maximum torque occurring during regular operation with the shaft rotating in the first direction of rotation 1', while exceeding of this torque produces slip. If, thus, during operation in the second direction of rotation 1", slide faces 21 and 21' "get stuck" at the participating mating faces due to the action of conveying grooves 24 and 24', respectively, (instead of forming a pressure cushion as in the first direction of rotation 1'), the relative rotational movement between the shaft and walls 4, 4' is absorbed by the slip of dynamic sealing device 15, 15' or 15" and the operationally employed slide seal faces are protected against excess stresses.

Figure 5:
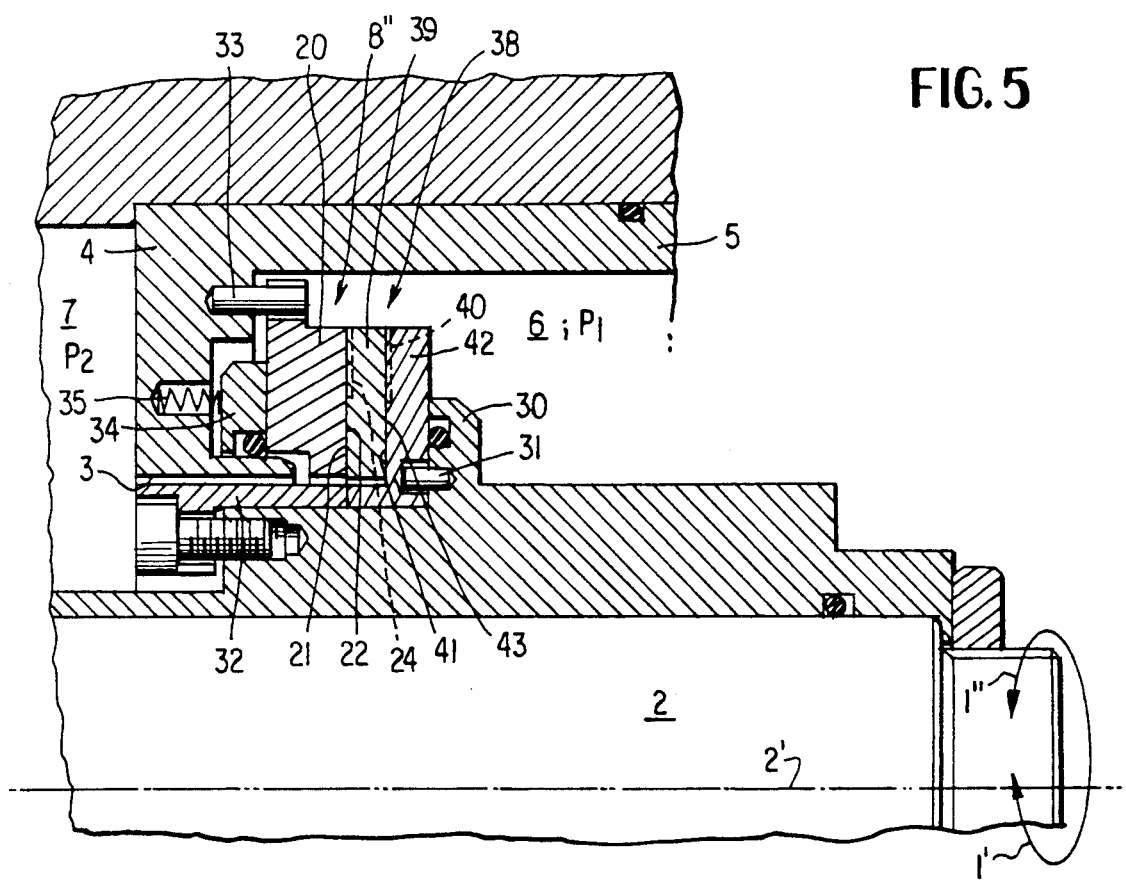
FIG. 5 is a longitudinal sectional view of the upper portion of a single-action slide ring seal according to the invention whose free-wheeling coupling is formed by an additional gas lubricated slide ring seal.

In the fourth embodiment shown in FIG. 5, the free-wheeling coupling is formed by an additional, gas lubricated slide ring seal 38 which simultaneously also performs the functions of the dynamic sealing device included in the auxiliary sealing arrangement and of the bearing. For this purpose, a ring body 39 is provided which is configured as an annular disk and surrounds shaft sleeve 9 in a floating arrangement. On its axial end face, the ring body carries the slide seal face 21 which is provided with conveying grooves 24 and which, together with the groove-free slide seal face 22 is a component of seal component group 8" that is active during regular operation. On the other axial end face of ring body 39, there is disposed a slide seal face 40 which cooperates with a slide seal face 41 provided with conveying grooves 43 and formed at a component 42 which is held at shaft sleeve 9 in a manner secure against rotation and is sealed against it. In the case of the embodiment shown in FIG. 5, in which grooves 24 and 43 are disposed in the slide seal faces of ring body 39 and of component 42, respectively, the center lines of these grooves have oppositely directed slopes relative to radii placed through the shaft axis. However, the grooves could also be disposed in the respectively other one of two cooperating slide seal faces and the axial succession of the operationally active seal component group 8" and the additional, gas lubricated slide ring seal 38 could be exchanged. Generally, it applies that the conveying grooves of the operationally active seal, i.e. the seal intended to perform the sealing function when the shaft rotates in the first direction of rotation 1', must be configured and arranged in the manner described in connection with FIGS. 1 and 2, while the conveying grooves of the additional, gas lubricated slide ring seal (which replaces the free-wheeling coupling) must be arranged to have its slope relative to the radius oriented opposite to this rule.

Figure 6:
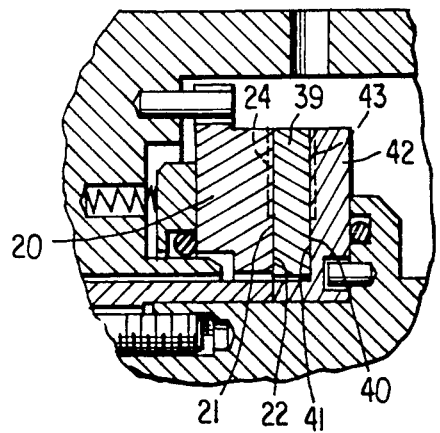
FIG. 6 is a partial longitudinal sectional view of a modification of the embodiment of FIG. 5.

According to a modification of FIG. 5 shown in FIG. 6, none of the two slide seal faces 21 and 40 of ring body 39 which is composed of a soft material, for example carbon, is provided with conveying grooves. A first set of conveying grooves 43 is formed (as in the case of FIG. 5) in slide face 41 of component 42 which is made of a hard material, for example silicon carbide is and a second set of conveying grooves 24 is disposed in slide face 22 of slide ring 21 which is also made of a hard material. Seen in a projection in a plane perpendicular to axis 2', the centerlines of conveying grooves 24 and 43 are sloped in the same direction.

We claim:

1. In a seal for a shaft (2) rotating, in regular operation, in a first direction of rotation (1') and passing through a wall (4; 4') separating a higher pressure chamber from a lower pressure chamber, the seal comprising at lest one seal component group (8; 8') performing a sealing function in the first direction of rotation (1') and including a first sealing member (19; 19') supported radially and in at least one axial direction at one of the shaft (2) and a component (9) fixed thereto and connected with one of the shaft (2) and the component (9) by way of a first torque transmitting device while being sealed against the shaft (2) by means of a first auxiliary sealing arrangement; said seal component group further including a second sealing member (20; 20') supported at one of the wall (4; 4') and a component fixed to the wall in the radial direction and in at least one axial direction and being connected with one of the wall (4; 4') and the component fixed to the wall by way of a second torque transmitting device while being sealed against one of the wall (4; 4') and the component fixed to the wall by means of a second auxiliary sealing arrangement, the two sealing members (19, 20; 19', 20') lying against one another at a sealing gap (23; 23') absorbing a relative rotational movement, the improvement wherein at least one of the sealing members (19; 19'; 37) is arranged to be rotatable on a bearing (16) coaxial with the shaft (2); the torque transmitting device of each sealing member comprising a free-wheeling coupling (17; 17') which, when the shaft (2) rotates in the first direction of rotation (1'), couples in the sense of transmitting torque and in the second direction of rotation (1") uncouples; and each auxiliary seal arrangement associated with a sealing member (19; 19'; 37) having a free-wheeling coupling (17; 17') including a dynamic sealing device (15; 15'; 15") arranged to absorb a relative rotational movement at least for a limited period of time and sealing a leakage path created by the free-wheeling coupling (17; 17') and the bearing (16).

2. A seal according to claim 1, further wherein the sealing group (8; 8'; 8") includes a gas lubricates slide ring seal comprising a sealing member (20; 20') having a planer slide seal face (22; 22') as well as another sealing member (19; 19'; 37) provided with conveying grooves (24; 24') in a slide seal face (21; 21') lying against said other sealing member by way of the sealing gap, said conveying grooves starting from a higher pressure ($p_1$) chamber (6) containing a gas and ending before reaching a lower pressure ($p_2$) chamber (7), at an inclination relative to radii placed through the shaft axis (2') so as to pump gas between the two slide seal faces (21, 22; 21', 22') and build up pressure cushions which cause the two slide seal faces to be separated when the shaft rotates in the first direction of rotation (1').

3. A seal according to claim 1, further wherein the dynamic sealing device (15) included in the auxiliary sealing arrangement is composed of a slide ring seal (14, 18).

4. A seal according to claim 1, further wherein one of the shaft (2) and a shaft sleeve (9) supported by the shaft is surrounded by an intermediate sleeve (10) rotatably mounted thereon by means of the bearing (16) and the free-wheeling coupling (17) is disposed in an annular chamber (11) left free between one of the shaft and the shaft sleeve, and the intermediate sleeve.

5. A seal according to claim 1, including a plurality of seal component groups in a tandem arrangement, wherein the first sealing members (19; 19') of each seal component group (8; 8') are mounted on a common intermediate sleeve (10) so as to be secure against rotation.

6. A seal according to claim 1, including two seal component groups in double-action arrangement, further wherein the first sealing members of the two seal component groups (8; 8') are combined into a common component configured as a one-piece is annular disc shaped body (37) whose bore forms a coupling face for the free-wheeling coupling (17').

7. A seal according to claim 2, further wherein the free-wheeling coupling and the dynamic sealing device included in an associated said auxiliary sealing arrangement are formed by an additional, gas lubricated slide ring seal (38) whose conveying grooves (43) are configured and arranged such that, during rotation of the shaft in the second direction of rotation (1"), the conveying grooves pump gas between the sliding faces (40, 43) of the additional, gas lubricated slide ring seal.

8. A seal according to claim 7, further wherein one slide seal face (21; 40) of the gas lubricated slide ring seal and of the additional, gas lubricated slide ring seal (38) are formed at a ring body (39) disposed coaxially with the shaft (2) and is rotatable about the shaft.

9. A seal according to claim 8, further wherein the ring body (39) is an annular disc provided with a slide seal face (21; 40) on each of its axially oppositely disposed sides, one (21) of said slide seal faces being provided with conveying grooves (24) sloped in a first direction relative to a radius through the axis (2') and lying by way of the sealing gap against a slide seal face (22) free of conveying grooves and secured against rotation relative to the wall (4), the other slide seal face (40) being free of conveying grooves and lying, by way of a sealing gap, against a slide seal face (41) secured against rotation relative to the shaft (2) and is provided with conveying grooves (43) that are sloped in a second, opposite direction.

10. In a seal for a shaft (2) rotating, in regular operation, in a first direction of rotation (1') and passing through a wall (4; 4') separating a higher pressure chamber from a lower pressure chamber, the seal comprising at least one seal component group (8; 8') performing a sealing function in the first direction of rotation (1') and including a first sealing member (19; 19') supported radially and in at least one axial direction at one of the shaft (2) and a component (9) fixed thereto and connected with one of the shaft (2) and the component (9) by way of a first torque transmitting device while being sealed against the shaft (2) by means of a first auxiliary sealing arrangement; said seal component group further including a second sealing member (20; 20') supported at one of the wall (4; 4') and a component fixed to the wall in the radial direction and in at least one axial direction and being connected with one of the wall (4; 4') and the component fixed to the wall by way of a second torque transmitting device while being sealed against one of the wall (4; 4') and the last-named component by means of a second auxiliary sealing arrangement, the two sealing members (19, 20; 19', 20') lying against one another at a sealing gap (23; 23') absorbing a relative rotational movement, the improvement wherein at least one of the sealing members (19; 19'; 37) is arranged to be rotatable on a bearing (16) coaxial with the shaft (2); the torque transmitting device of each sealing member comprising a friction coupling which limits the transmitted torque and is dimensioned such as to establish a substantially slip-free connection up to a predetermined torque which is slightly greater than the maximum torque occurring during regular operation when the shaft (2) rotates in the first direction of rotation (1') and permits a relative rotational movement when said predetermined torque is exceeded; and each auxiliary seal arrangement associated with a sealing member (19; 19'; 37) having a friction coupling including a dynamic sealing device (15; 15'; 15") arranged to absorb a relative rotational movement at least for a limited period of time and sealing a leakage path created by the friction coupling and the bearing (16).

11. A seal according to claim 10 further wherein the friction coupling is formed by a dynamic sealing device included in the auxiliary sealing arrangement.

* * * * *